W. DUNNING.
Carriage-Brake.
No. 4,254. Patented Nov. 1, 1845.
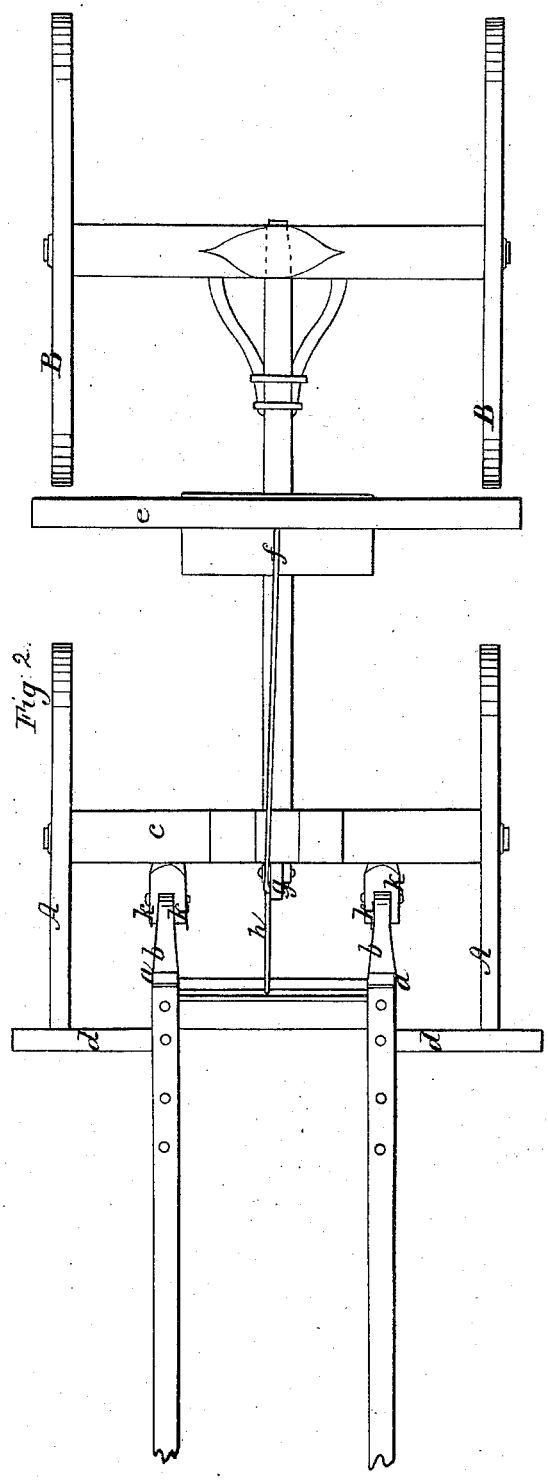
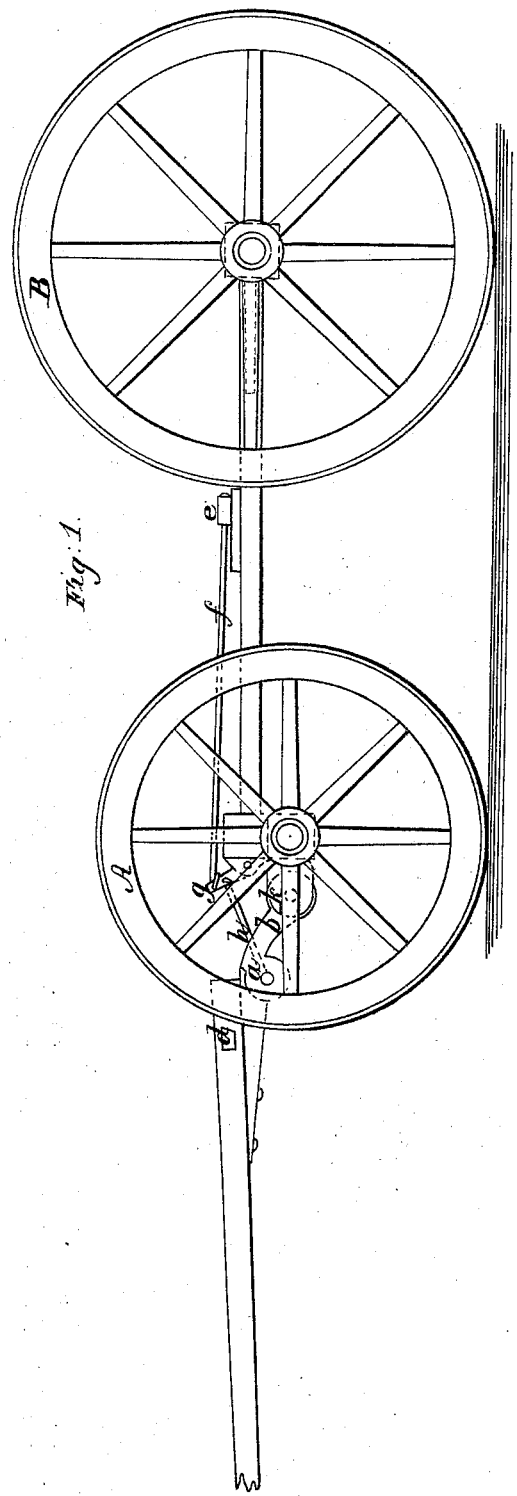

UNITED STATES PATENT OFFICE.

WM. DUNNING, OF DUNNINGSVILLE, PENNSYLVANIA.

MODE OF OPERATING BRAKES FOR CARRIAGE-WHEELS.

Specification of Letters Patent No. 4,254, dated November 1, 1845.

*To all whom it may concern:*

Be it known that I, WILLIAM DUNNING, of Dunningsville, in the county of Washington and State of Pennsylvania, have invented a new and useful Improvement in Carriage-Rubbers, which I denominate the " Self-Acting Carriage-Rubber"; and I do hereby declare that the following is a full, clear, and exact description thereof and of the manner of using and constructing the same, reference being had to the annexed drawings forming part of this specification, in which—

Figure 1 is an elevation, and Fig. 2, a top view.

The same letters refer to like parts in the figures.

The nature of my invention consists in an improvement in the carriage rubber, or check, for increasing the draft of vehicles while descending inclined planes, and which by my arrangement I cause to be self acting, and can at any moment produce a gradual or nearly instantaneous halt, an object greatly to be desired when heavy vehicles may become ungovernable in rapidly descending steep hills.

The construction, or the manner of adjusting and using my improvement, I will proceed to describe as follows: For one horse vehicles where shafts are used, I construct a joint $a$, in the forward part next the shaft, of each goose neck, or irons, $b$, $b$, connecting the shafts with the front axle $c$; this joint is formed like a common butt hinge so as to bend only one way and is formed upon the goose neck with the back part or shoulders upward, so that when the shafts are raised or drawn forward the two shoulders of the joint come together and make a firm support. There is also another joint at the end of each goose neck nearest to the axle $c$, formed by ears, $k$, projecting from said axle, which are attached to the goose-necks by means of pins which allow them to play freely. Upon the side of each shaft, I project a friction arm or rubber, $d$, $d$, which is made of iron or other hard material, each arm extending out an inch or two beyond the periphery of the front wheels A, A, and within three or four inches of touching it, so as to allow ample play for the wheels. Now when the carriage is drawn forward by the shafts, the above-mentioned hinge opening, the shoulders or back which is upward as before stated, must close in proportion to the draft, but when by descending an inclined plane, the inertia of the carriage throws its whole weight forward, the front axle $c$, is advanced, thereby throwing that part of the goose-neck next to it forward, which opens the shoulders of the hinge or joint $a$, upon its other end, and allows the front wheels A, A, to advance against the friction arms or rubbers, $d$, $d$, upon the shafts, when the too rapid motion of the carriage is gradually subdued. Where two or more horses are required, the vehicle must of course be provided with a tongue, which tongue is generally attached to the axle by two iron rods or goose-necks in the same manner as the shafts are connected; these goose-necks are provided with joints or hinges exactly like those above described which I place upon shafts, but I have a friction bar extending from one front wheel to the other and fastened in the middle to the tongue, or I use the double tree or timber to which the horses are attached by lengthening it at each end so as to extend it out a few inches beyond and in front of the wheels. This mode is not represented in the drawings, not being deemed essential, as those engaged in the manufactory will readily understand the change. When the horses are backed, or the loaded carriage runs upon them, the goose-necks are thrown upward by means of these joints, when the distance between the pole and axle is lessened, and the rubbers must of course come in contact with the periphery of the wheels, thereby checking the progress of the vehicle.

It will be readily seen that the above described improvements will not in any wise disfigure a carriage, but they may be made ornamental, while the projection of the rubber in front of the wheel may be serviceable as a step. My improvements are also easily adjustable, and can be put on any vehicle with little expense.

When an additional friction is required upon the hind wheels, as for instance heavy wagons, or cross piece or ordinary friction bar $e$, extending across the perch from one hind wheel, B, B, to the other, is made to act as a rubber near each end by means of an iron rod $f$ attached to the middle of said cross piece, which iron rod $f$, extending forward immediately over the lower part of the front spring is connected to a lever $g$, the lower end of which is secured by a pin to ears projecting from the end of the perch that connects with the front axle, thus forming a joint on which said lever works; to the upper end of this lever there is also another rod $h$, firmly secured, which extending forward is attached to the middle of the tongue or shaft as the case may be. It will be obvious that when the front rubbers act, the rear or hind wheel rubbers also are forced against the hind wheels by the connecting rod being pushed backward; all of which are dependent upon the joints in the goose necks.

Having thus fully described the construction and operation of my improvement, what I claim as new therein and desire to secure by Letters Patent, is

The useful combination of the brake or rubber with a shaft or shafts jointed to the goose-necks by a rule joint, in the manner and for the purpose herein set forth and fully made known.

WILLIAM DUNNING.

Witnesses:
RT. W. MILLER,
GEORGE W. BRICE.